(12) United States Patent
Kranda et al.

(10) Patent No.: US 12,181,779 B2
(45) Date of Patent: Dec. 31, 2024

(54) CAMERA RETRACTOR MECHANISM

(71) Applicant: Sullivan, Higgins, and Brion Power Plant Engineering, LLC, Mobile, AL (US)

(72) Inventors: Michael J. Kranda, Portland, OR (US); Clay J Hammond, Forest Grove, OR (US); Daniel R Higgins, Tigard, OR (US)

(73) Assignee: Sullivan, Higgins, and Brion Power Plant Engineering, LLC, Mobile, AL (US)

( * ) Notice: Subject to any disclaimer, the term of this patent is extended or adjusted under 35 U.S.C. 154(b) by 122 days.

(21) Appl. No.: 18/051,874

(22) Filed: Nov. 1, 2022

(65) Prior Publication Data
US 2023/0205056 A1 Jun. 29, 2023

Related U.S. Application Data

(60) Provisional application No. 63/274,937, filed on Nov. 2, 2021.

(51) Int. Cl.
G03B 17/04 (2021.01)
G03B 17/12 (2021.01)
G03B 17/56 (2021.01)
H04N 23/51 (2023.01)
H04N 23/57 (2023.01)
H04N 23/69 (2023.01)

(52) U.S. Cl.
CPC ............. *G03B 17/04* (2013.01); *G03B 17/12* (2013.01); *G03B 17/561* (2013.01); *H04N 23/51* (2023.01); *H04N 23/57* (2023.01); *H04N 23/69* (2023.01)

(58) Field of Classification Search
CPC ........ H04N 23/69; H04N 23/51; H04N 23/57; G03B 17/04; G03B 17/561
See application file for complete search history.

(56) References Cited

U.S. PATENT DOCUMENTS

2022/0116515 A1* 4/2022 Chen .................... G03B 11/045

* cited by examiner

*Primary Examiner* — Minh Q Phan
(74) *Attorney, Agent, or Firm* — Michael O Scheinberg; Scheinberg & Associates, PC

(57) ABSTRACT

A camera retractor assembly for a furnace includes a faceplate configured to be attached to a furnace; a retractor carriage configured to be attached to the faceplate; a pneumatically operated retractor slidably supported by the retractor carriage; a camera enclosure attached to the retractor; a lens tube attached the camera enclosure; and at least one of a control panel, an air manifold or an air reservoir attached to the camera retractor assembly.

12 Claims, 11 Drawing Sheets

CAMERA RETRACTOR MECHANISM

TECHNICAL FIELD OF THE INVENTION

The present invention relates to a camera retraction mechanism for use with furnaces.

BACKGROUND OF THE INVENTION

Chemical recovery boilers are used in the pulp and paper industry as a means to recover spent cooking chemicals and the heating value of the black liquor fuel fired therein. In the Kraft pulping process, wood chips are processed (or cooked) in a digester in which they are subjected to high temperature and pressure in the presence of caustic chemicals. In the digester the lignin binding the wood fibers is dissolved liberating the fibers to be used to make pulp. The Kraft process produces relatively long fibers that are used to manufacture strong paper products and is commonly used in all sorts of packaging. After the wood chips are dissolved the spent cooking chemicals, dissolved lignin, and unsuitable wood fibers are captured, the excess moisture is evaporated, and the resulting black liquor is fired in a recovery boiler. After evaporation the moisture content of the black liquor typically ranges from 20% to 40% depending on the equipment and operation of the individual mill. The black liquor solids consist of approximately 50% inorganics (spent cooking chemicals) and 50% organic material (lignin and wood fibers). The black liquor is injected into the recovery boiler through one or more atomizing spray nozzles, the residual moisture is evaporated, and the organic material is burned. During the combustion process the spent cooking chemicals are liberated and undergo chemical reduction. The predominant spent cooking chemical in a black liquor recovery boiler is sodium sulfate ($Na_2SO_4$) and in the presence of heat and elemental carbon is reduced to sodium sulfide ($Na_2S$). This is an endothermic reaction absorbing heat from the combusting volatiles and char. Reduction efficiency is the ratio of the concentration of the total sulfur in the smelt minus the concentration of sulfate divided by the total sulfur (on a practical basis this can be expressed as $Na_2S/(Na_2S+Na_2SO_4)$). Reduction efficiencies of 95% or higher can be achieved on well-run recovery boilers. Other types of recovery boilers are used such as soda boilers and red liquor boilers in which different chemical mixtures are used to dissolve the wood chips, but black liquor boilers are the most common type by far.

Cameras are used to observe conditions inside recovery boilers. Cameras can be used to measure the height and shape of the char bed and to measure temperature within the furnace. Infrared cameras see through the flame to observe fuel and furnace components. By observing conditions inside the furnace, combustion can be optimized to improve efficiency and reduce pollution.

The camera lens is typically positioned in a tube that is inserted through a port in the furnace. Cameras lenses tend to accumulate contamination and need to be cleaned periodically. To clean the camera, it is retracted from the furnace. The camera is expensive and can be damaged if it gets too hot. The lens tube is therefore typically air cooled and must be retracted from the furnace if the lens starts to overheat.

FIG. 1A shows schematically a typical prior art camera retractor system 100 for a recovery boiler 101. A camera 102 is positioned within a camera enclosure 104. A lens tube 106 extends from camera enclosure 104 through a port 108 in a furnace wall 110. FIG. 1B shows an alternative configuration (with much of the detail omitted), in which the camera 102 extends through a windbox or nozzle (also referred to as a register) attached to the furnace wall. Camera enclosure 104 is attached by a connection 112 to a retractor 120 within a retractor support 122. As retractor 120 moves within retractor support 122, camera enclosure 104 moves with the retractor 120, pulling lens tube 106 through port 108 and extracting it from furnace 101. A flap 124 covers port 108 when lens tube 106 is retracted. A port rodder 130 extends from a port rodder activator 132 to clean port 108.

A controller 134 uses an external supply of compressed air through a compressed air supply line to control the movement of pneumatically-operated rodder activator 132 and camera retractor 120 using a first solenoid 136A for the retractor 120 and a second solenoid 136B for an optional rodder 132. The cooling airflow for the enclosure and the lens tube are controlled by two separate regulators. A reserve air tank 138 provides air for retraction in the event that the external air supply and/or electrical is interrupted.

SUMMARY OF THE INVENTION

An object of the invention is to provide a method and apparatus for camera retraction in a furnace.

Various embodiments of the camera retract mechanism described in this disclosure.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

The term "furnace" as used herein in interpreted to include recovery boilers, solid fuel boilers, or any type of combustion apparatus.

A preferred embodiment of the invention includes several improvements, and not every embodiment requires the use of all of the improvement.

Some embodiments integrate various components that have been separated in the prior art, the integration providing unexpected benefits.

Some embodiments incorporate a compressed air manifold, that is, a pipe or chamber having multiple compressed air outlets. In the prior art, multiple air connections were required to supply air to different parts of the retractor mechanism and the large number of tubes and wires could impeded movement of the camera and provide additional potential failure modes. This resulted in a "spaghetti" mess of with air hoses and cables. A manifold, particularly one positioned on the retractor mechanism itself, provides a source of pressurized air to the various components and requires only a single input from an air supply, thereby reduces the number of external air hoses. A manifold mounted on the retractor mechanism allows a single air supply to the retractor assembly to provide multiple functions.

Figure 7:
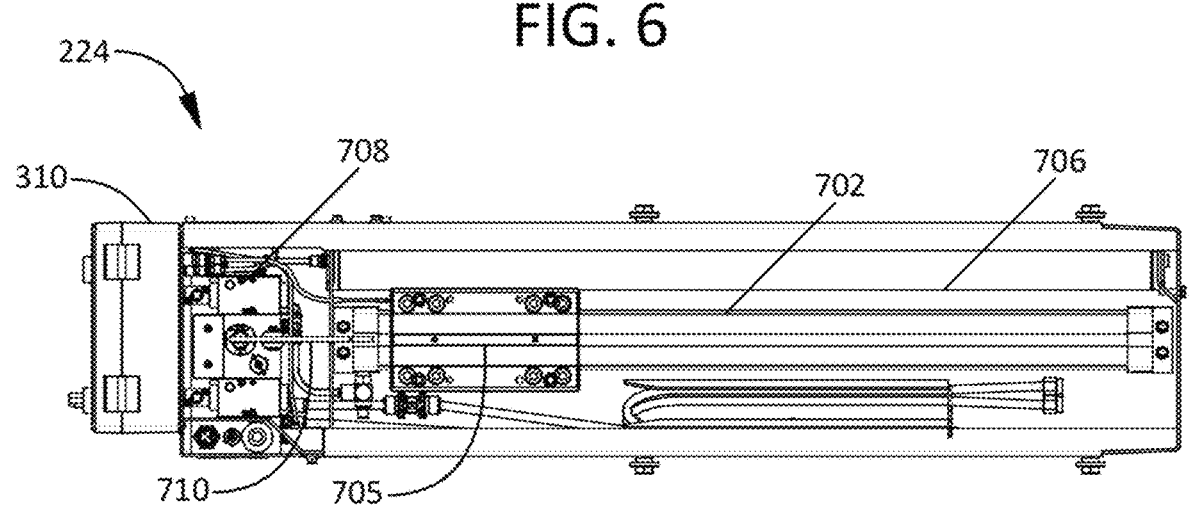
FIG. 7 shows a bottom view of the camera retraction assembly.

Some embodiments include an on-board air reservoir, that is, an air reservoir that is mounted on the retractor assembly and that serves as a source of compressed air to the system to retract the camera if the external air supply that provides cooling is lost. FIG. 7 shows the on-board reservoir as a cylinder tucked up under the bottom side of the retract canopy. If a sudden loss of pressure occurs, the reservoir will provide the needed pressure/flow to the rodless cylinder, to ensure the camera is pulled from service to protect the lens assembly. Positioning the reservoir on the retractor assembly also helps to minimize the "spaghetti" mess found in prior art systems.

Some embodiments include an on-board control panel mounted to the retractor canopy for controlling the camera retract assembly and the port cleaner. Mounting the control panel on the retractor assembly also simplifies routing of cables, reducing the spaghetti mess.

Some embodiments include fail-safe in case of a loss of cooling air flow to the camera lens. A low pressure switch is incorporated into the controls, to function as a fail-safe in the event of a loss of cooling air to the lens tube. The camera will be pulled from service until air pressure is restored to the system.

Some embodiments include a loss-of-power fail safe. In some embodiments, in the event there is a loss of power to the system (local or facility-wide), the camera will be pulled from service as a fail-safe precaution, until the power is restored.

Some embodiments provide a camera lock-out feature. Whenever the camera is pulled from service, even during the routine port cleaning cycle, the camera is locked in place by a hook and prevented from going into the boiler unless there is sufficient air pressure to the manifold. Cameras are sometimes installed at angles such that if there were a loss of pressure to the system, the camera can slide back into the boiler due to gravity after being retracted if air pressure is lost. The hook prevents the camera from sliding back into the furnace unless there is sufficient air pressure to release the hook.

Some embodiments provide a programable logic controller, such as a Siemens PLC. The control panel mounted on the on-board control panel incorporates a dedicated PLC (programmable relay), used to control both the retract and the camera cleaner. This PLC is able to generate fault codes, in the event something goes wrong with the system, including a low pressure condition and/or camera proximity sensor is not being met (required before the cleaner will cycle).

Some embodiments provide an adjustable retractor carriage—The retractor carriage can be adjusted inward/outward relative to the port opening, as needed in order to optimize visibility of the camera into the boiler.

Figure 11:
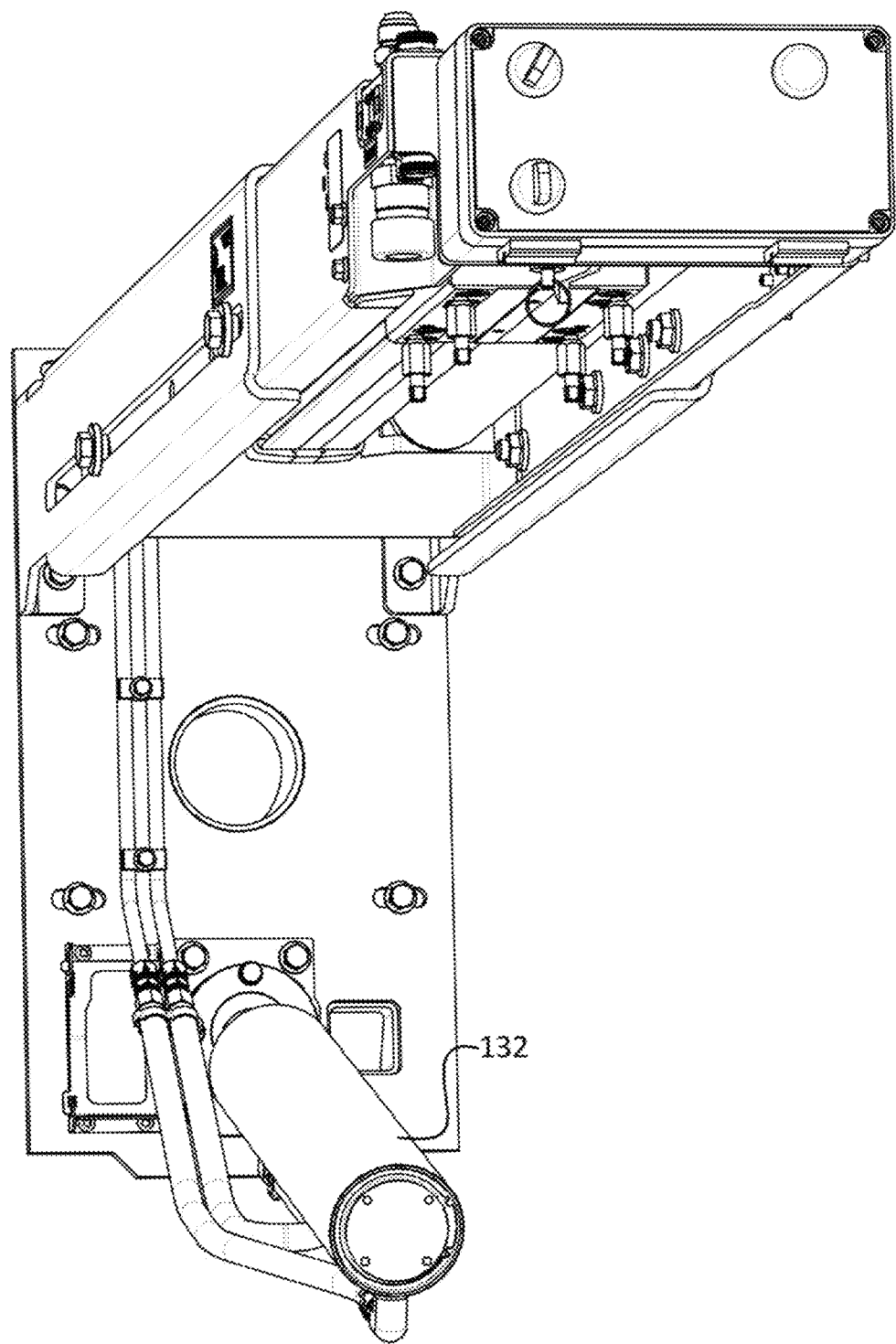
FIG. 11 shows a camera port cleaner.

Some embodiments provide a camera port cleaner as shown in FIG. 11. It has a "ball-and-socket" design, which allows for the cleaner to be adjusted as needed for optimal cleaning of the camera port. To minimize the spaghetti effect, air tubing has been incorporated into the design and fixed to the faceplate, in order to keep it as clean as possible. The cleaning head as shown in FIG. 12 is modeled after the known and proven serrated design of the primary port cleaners.

Figure 12:
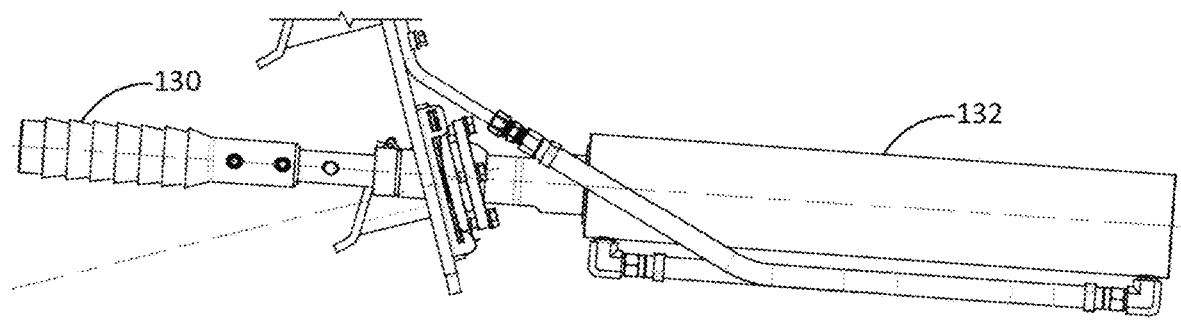
FIG. 12 shows the cleaning heard of port cleaning.

Some embodiments provide a rodding access port as shown in FIG. 12. The primary port rodders incorporate a rodding access port into the faceplate, should there ever be a need to get in there with a cleaning rod for any reason.

Some embodiments provide a window with a small spring, which requires no tools to remove/replace the window glass. The window assembly is shown in FIGS. 3A, 3B, 11 and 12.

Figure 5:
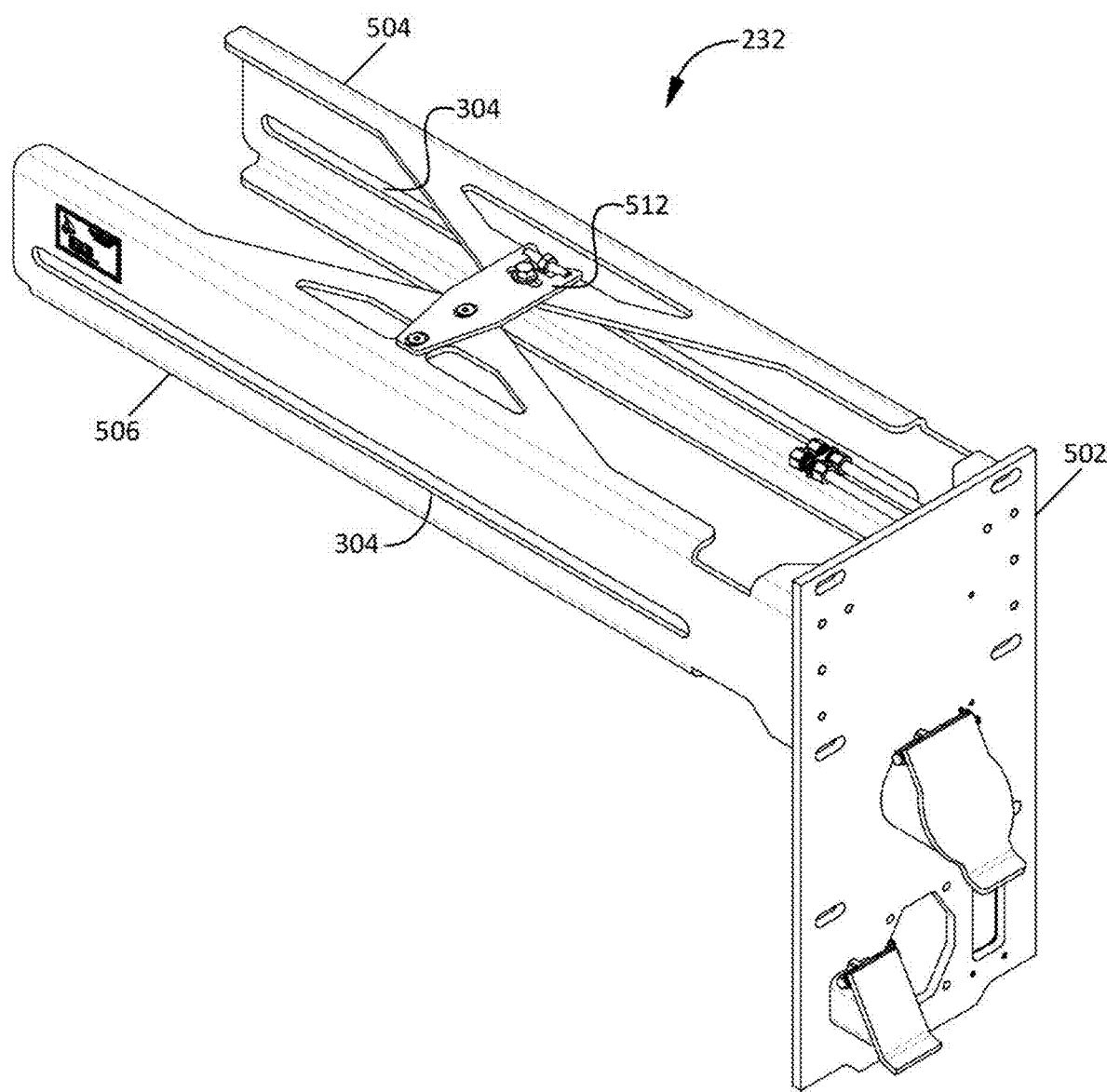
FIG. 5 shows a faceplate assembly used to support a camera retractor carriage.

Some embodiments provide cross member adjustment shown in FIG. 5. This part of the design allows for any resulting horizontal misalignment between the camera lens and port opening to be corrected once the boiler has come up to temperature.

Some embodiments provide a free floating lens seal. The lens tube seal utilizes a free-floating design, which allows for the lens tube to seal off combustion air supply in the windbox, even when the lens tube may not be properly aligned with the port opening.

Some embodiments provide a pressure relief/dump valve. A high-pressure relief valve prevents damage in the event the pressure to the system exceeds about 110 psi. This same valve can also be used to de-energize the system, should there be a need to work on it. By pulling the ring, the pressure stored in the air reservoir, retract cylinder and port cleaner cylinder can be dumped to the atmosphere.

Some embodiments provide an easy-mount camera mounting bracket for the camera that allows for it to be easily removed/installed, whenever the camera needs to be pulled from the boiler during outages, water washes, etc.

Some embodiments provide easy-mount bracket adjusting struts or turnbuckles. The camera mounting bracket has a second form of adjustment, utilizing two struts that provide vertical adjustment, should it ever be needed once the camera has been installed. These struts can adjust the lens tube vertically and horizontally to compensate for lens sag and misalignment caused by manufacturing tolerance stack-up.

In some embodiments, the camera will automatically retract if there is insufficient pressure to maintain a pressure switch in the closed position. In some embodiment, a hook engages the camera assembly so that it cannot slide back into the furnace if power or air pressure is lost.

A camera retraction mechanism as disclosed herein offers many advantages over the prior art.

Figure 1A:
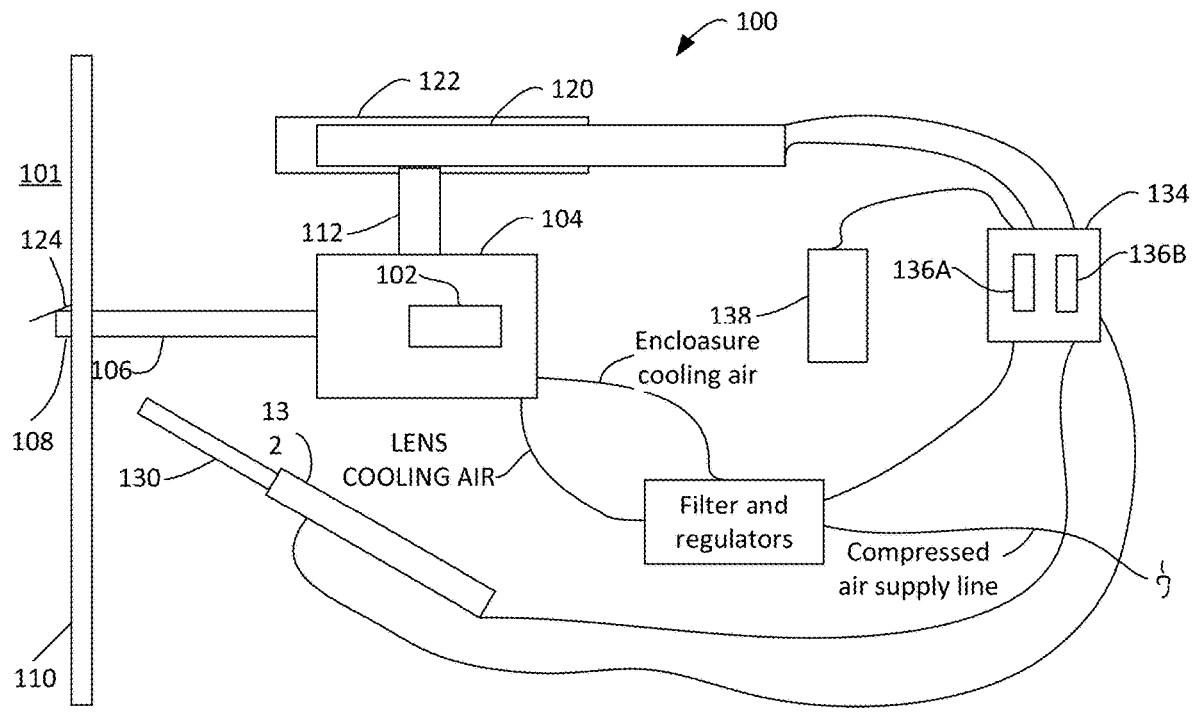
FIG. 1A is a schematic drawing of a prior art camera retraction.
Figure 1B:
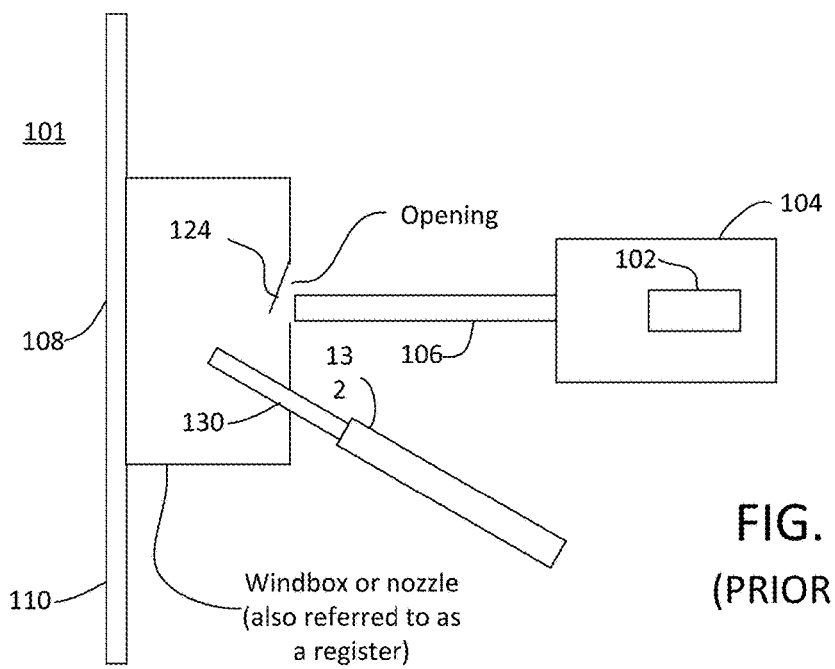
FIG. 1B is a partial schematic of an alternative prior art configuration.
Figure 2:
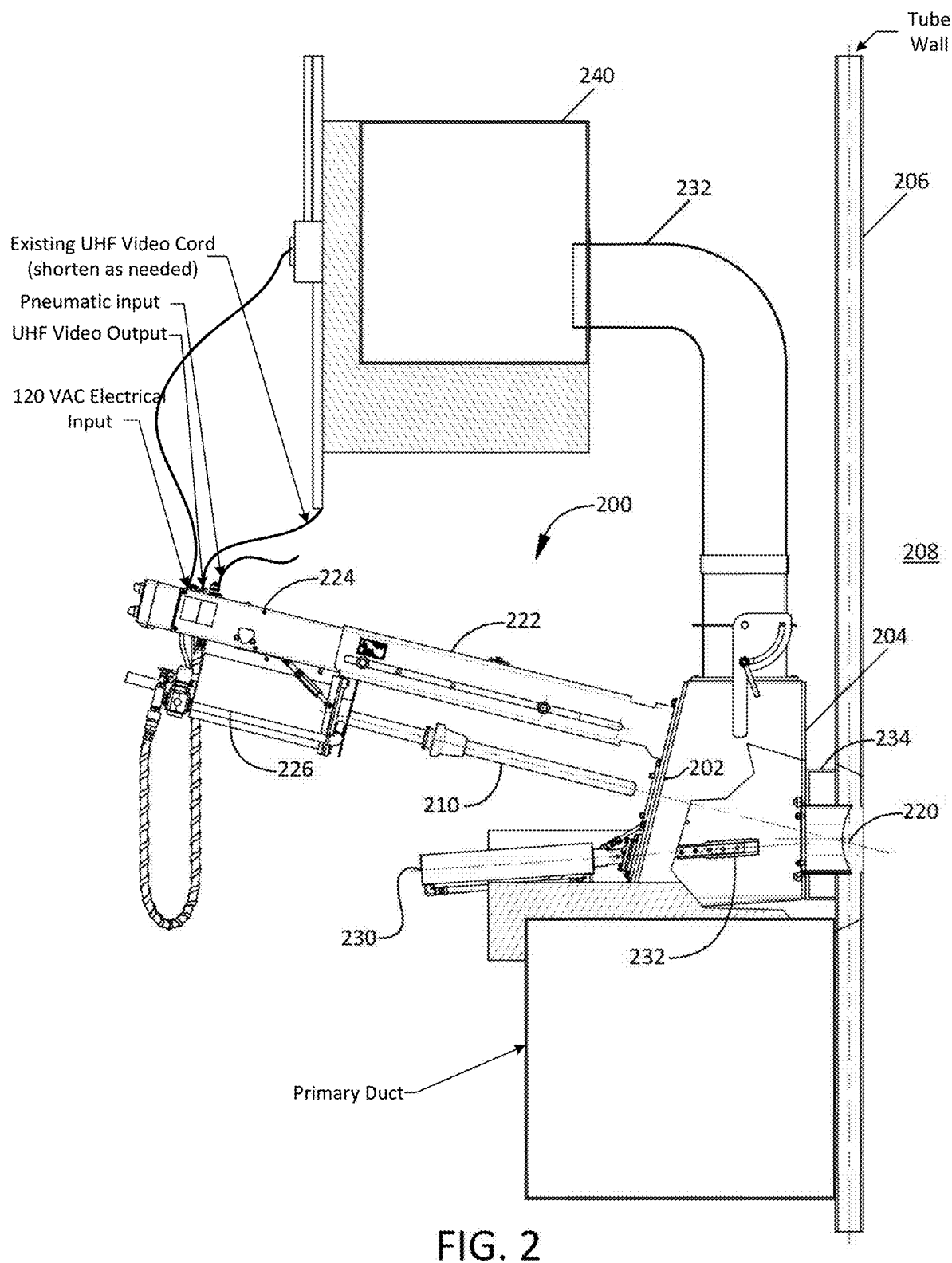
FIG. 2 shows an embodiment of a camera retraction assembly attached to a windbox by a furnace wall.

FIG. 2 shows an arrangement of a camera retraction assembly 200 mounted onto a first wall 202 of a windbox or chamber 204 near a furnace wall 206 of a furnace 208. A lens tube 210 is configured to extend through a camera port 220 into the furnace 208. Camera retraction assembly 200 includes a faceplate assembly 222 and a retractor carriage 224 to which a camera housing assembly 226 is attached. Part of chamber 204 is shown broken away to show a portion of a rod cleaning device 230 that extends a rod 232 to clear the opening of camera port 220 when necessary. A duct 240 provides air flow through a duct 232 into chamber 204. A seal box 234 attaches chamber 204 to furnace wall 206.

Figure 3A:
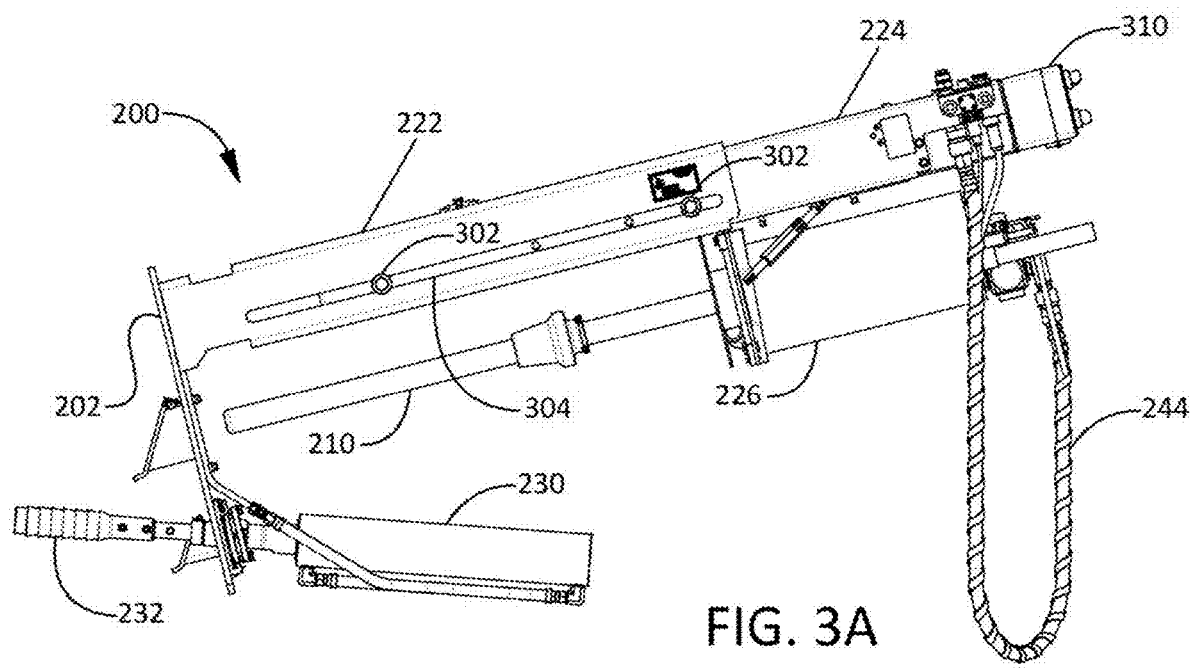
FIG. 3A shows a side view of the camera retraction assembly of FIG. 2.
Figure 3B:
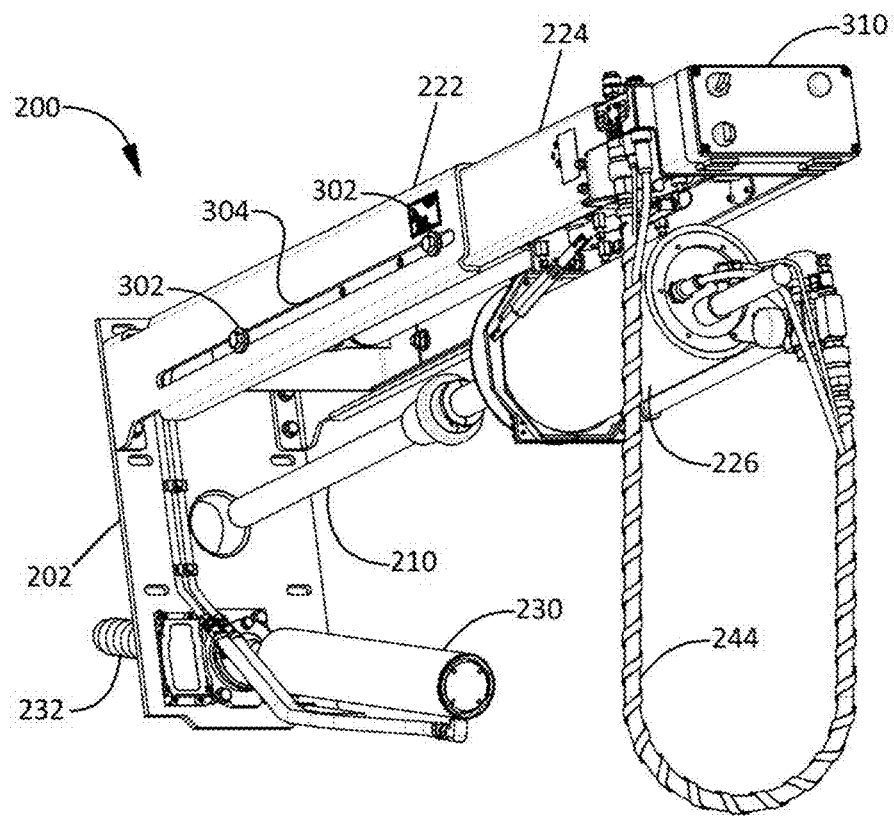
FIG. 3B shows an isometric view of the camera retraction assembly of FIG. 2.

FIG. 3A is a side view and FIG. 3B is an isometric view of camera retract assembly 200. Face plate assembly 222 is mounted to a chamber wall 202 or optionally to a furnace wall. Bolts 302 pass through slots 304 in faceplate assembly 222 and into retractor carriage 224 to allow retractor carriage 224 to be positioned relative to face plate assembly 222. Cleaner assembly 230 can be activated to extend rod 232 to clean debris from the port 220 (FIG. 2) in the furnace wall through which the camera lens tube 210 extends. A cord and hose assembly 244 contains air hoses and control cables that extend from the retractor carriage 224 to the camera housing 226. A control box 310 mounted on the end of retractor carriage 224 includes a controller that controls the camera retraction assembly 200.

Figure 4:
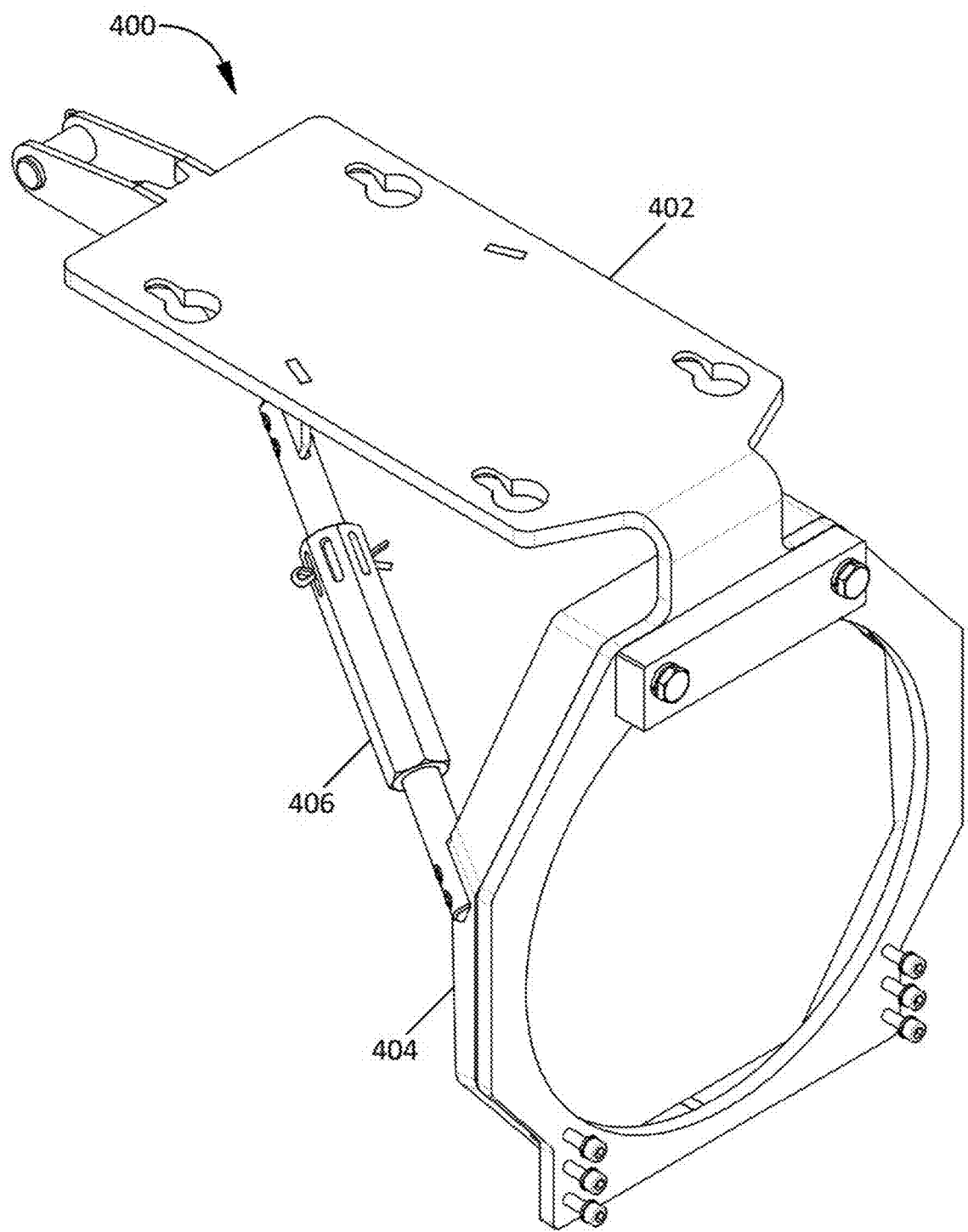
FIG. 4 shows a mounting bracket assembly for attaching a camera to the camera retraction assembly.

FIG. 4 shows a mounting bracket assembly 400 on which the camera assembly 226 is to be mounted. Top plate 402 bolts to the retractor assembly 224 and front bracket 404 attaches to the camera assembly 226. A turnbuckle 406 can be used to adjust the angle between the top plate 402 and the front bracket 404 to adjust the aim of the camera. A second turnbuckle on the opposite side of the of the camera mounting bracket is not visible.

FIG. 5 shows a faceplate assembly 232 which includes a front plate 502 that mounts to a chamber wall 202 (FIG. 2). Faceplate assembly 232 includes a left camera bracket 504 and a right camera bracket 506. Left camera bracket 504 and right camera bracket 506 include slots 304 through which bolts 302 can pass into the retractor assembly 224. An angle adjuster 512 connects between left camera bracket 504 and right camera bracket 506 and allows a change in the alignment between left camera bracket 504 and right camera bracket 506, which in turn changes the direction toward which the camera is aimed.

Figure 6:
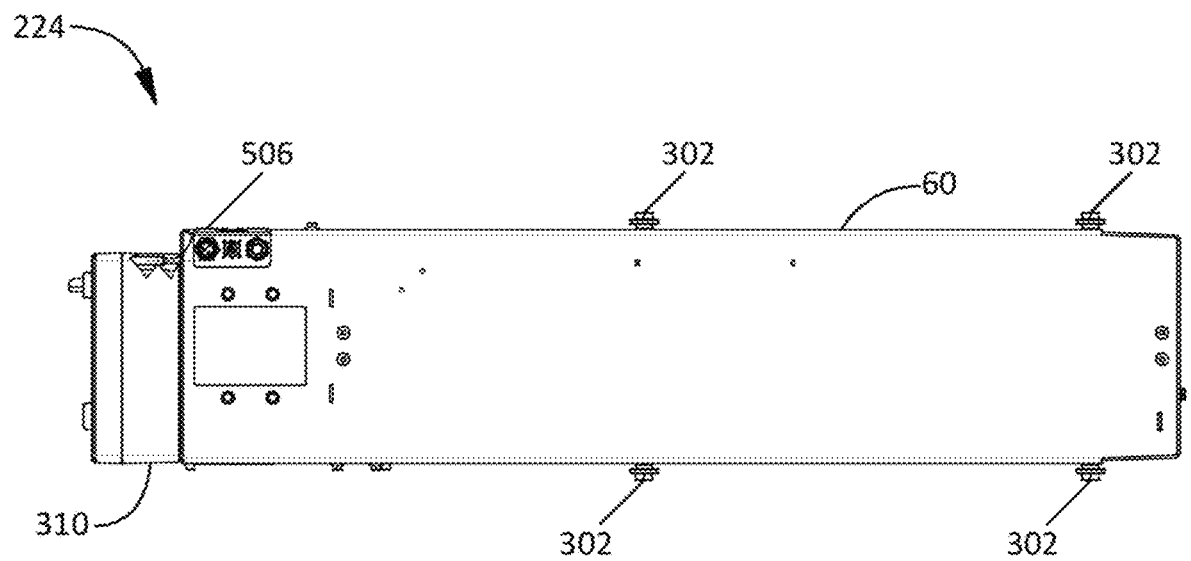
FIG. 6 shows a top view of camera retraction assembly.

FIG. 6 shows a top view, and FIG. 7 shows a bottom view, of camera retraction assembly 224. An air cylinder assembly 702 includes an air cylinder to which is attached a camera platform 705 to which top plate 402 of camera bracket assembly 400 can be attached. When air pressure is applied within the air cylinder, it extends and the camera assembly 226 moves toward the furnace wall so that lens tube 210 extends into the furnace for imaging the combustion chamber. An air reservoir 706 provides air to operate air cylinder 702 retract when an external air supply is interrupted. A manifold assembly 708 includes a hook 710 that clamps onto camera bracket assembly 400 in its retracted position to keep the camera and tube from sliding toward the furnace. When the supply of compressed is interrupted, a controller in control box 310 causes a valve to open and compressed air in air cylinder 702 causes the camera to retract and causes hook 710 to engage to prevent the camera from extending into the furnace. A pressure switch prevents the hook 710 from releasing until air pressure is restored. Both the valve and hook mentioned above are spring loaded such that without adequate air pressure and/or power, the camera remains retracted and hooked. Power and adequate air pressure are required to disengage the hook and switch the valve that inserts the camera. i.e., both the hook and valve have a spring return in the failsafe direction.

Figure 8:
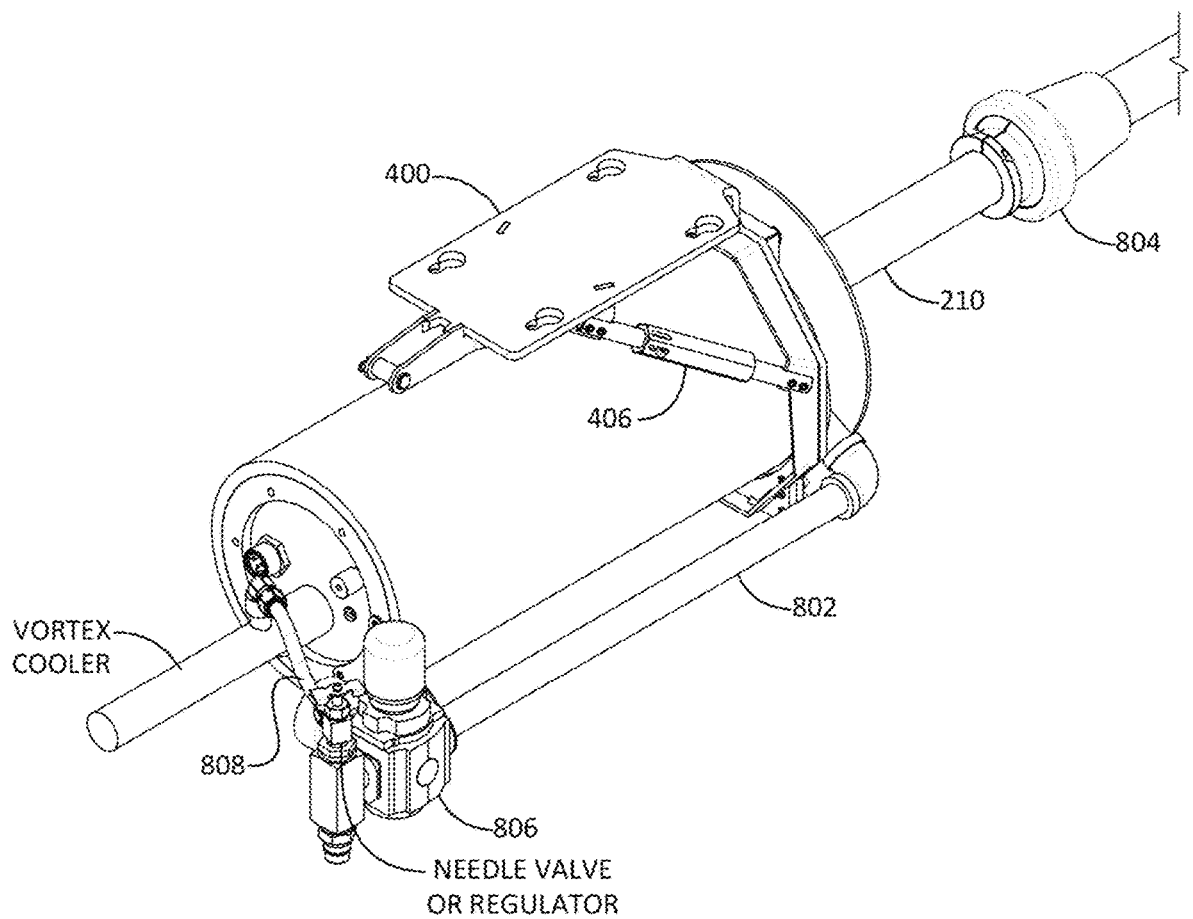
FIG. 8 shows camera assembly attached to mounting bracket assembly.

FIG. 8 shows camera assembly 226 attached to mounting bracket assembly 400. A pipe 802 delivers cooling air into camera lens tube 210 through a regulator 806. Only a portion of lens tub 210 extending past a port seal assembly 804 is shown. A needle valve (or regulator) controls the air flow into the camera housing vortex cooler through a tube 808.

Figure 9:
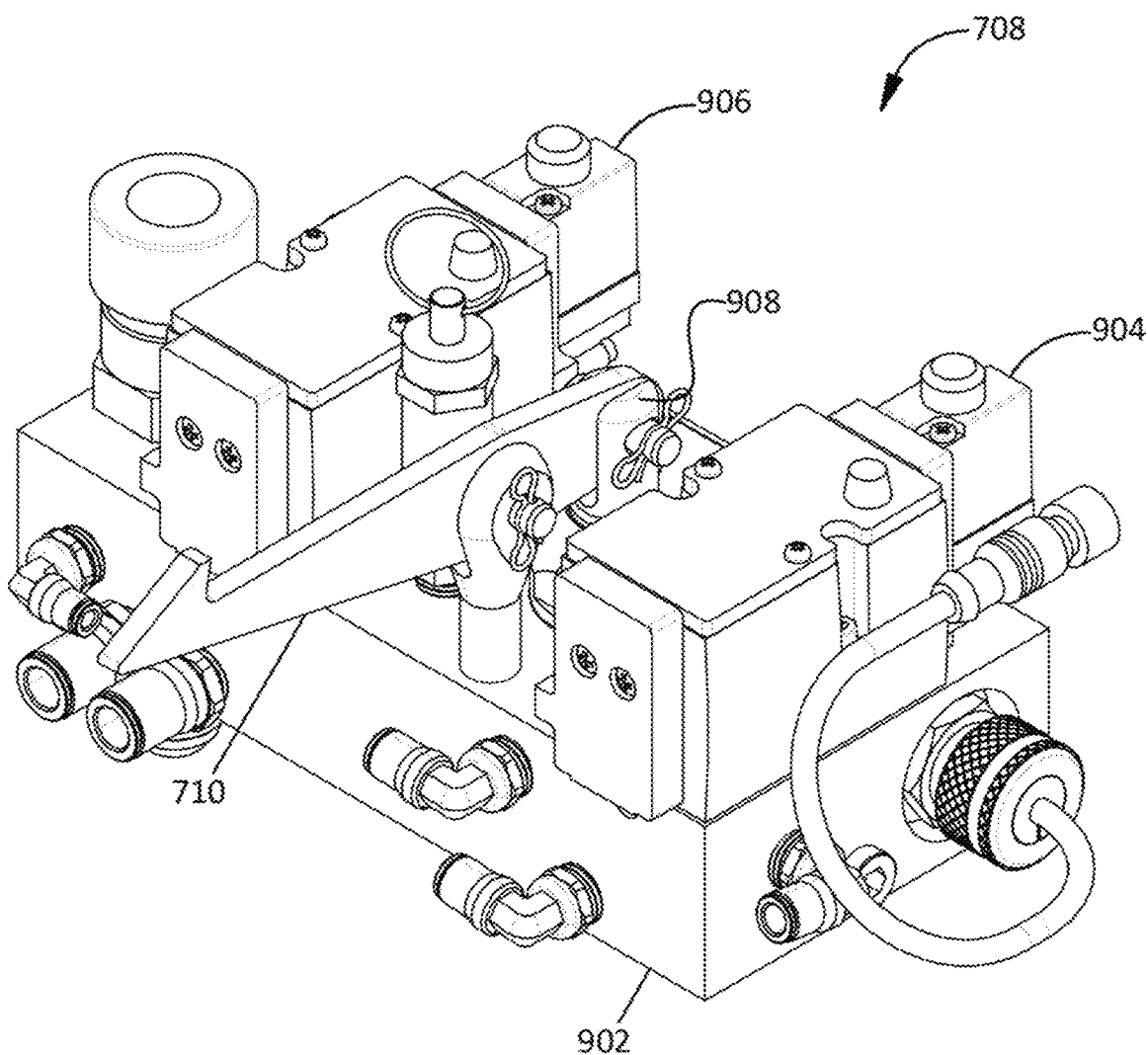
FIG. 9 shows an enlarged view of solenoid manifold assembly.

FIG. 9 shows an enlarged view of solenoid manifold assembly 708 that includes a manifold 902 that stores compressed air and distributes the compressed air to two valves 904 and 906. Hook 710 is operated by a piston 908.

Figure 10:
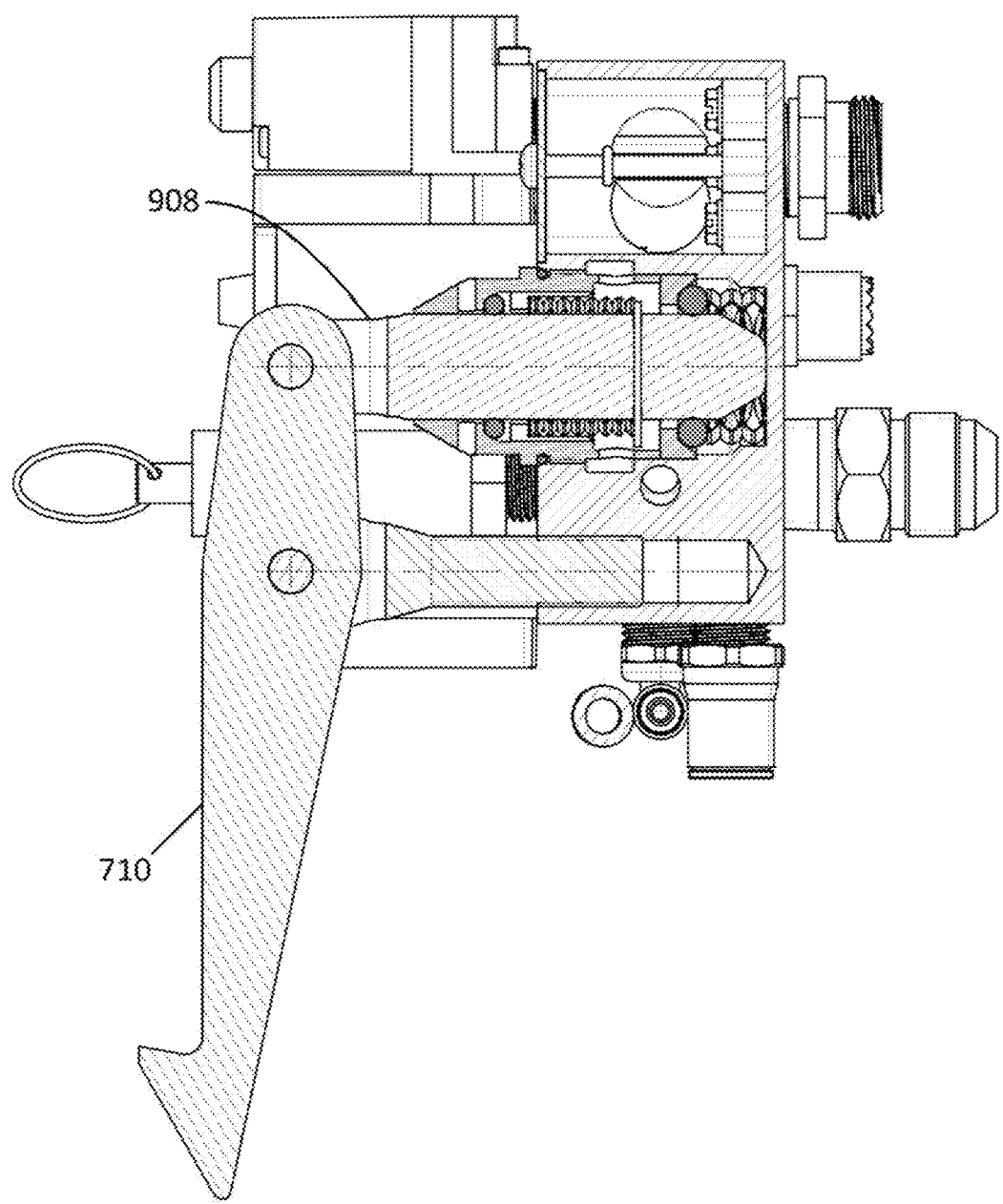
FIG. 10 is a cross section of the solenoid manifold assembly of FIG. 9.

FIG. 10 is a cross-section of the solenoid assembly of FIG. 9.

A preferred embodiment provides two adjustment mechanisms for aiming the camera: turnbuckles 406 and angle adjuster 512. The setting of angle adjuster 512, once set, does not require readjustment when the camera is removed and reinserted, for example, for cleaning or replacement. Minor adjustments can be made using turnbuckles 406 and such adjustments do not require removing the camera or disassembling the camera retraction assembly. While removing and reinserting the camera may alter the camera aim to some degree, the change is not significant, meaning that the change is aim is not so great that the aim cannot be corrected using the turnbuckles 406, which can be adjusted with the camera in place.

While the control panel, manifold, and air reservoir are preferably mounted on the retractor carriage, in some embodiments not all of the control panel, manifold, and air reservoir are mounted on the retractor carriage. For example, one or more of those components may be mounted on the faceplate or on the camera assembly. Moreover, not every embodiment requires a manifold and an air reservoir.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A camera retractor assembly for a furnace, comprising:
    a faceplate configured to be attached to the furnace;
    a retractor carriage configured to be attached to the faceplate;
    a pneumatically operated retractor slidably supported by the retractor carriage;
    a camera enclosure attached to the retractor;
    a lens tube attached the camera enclosure;
    a control panel attached to the camera retractor assembly;

an air manifold attached to the camera retractor assembly retractor carriage; and an air reservoir attached to the camera retractor assembly retractor carriage, the air reservoir configured to provide compressed air to retract the pneumatically operated retractor if an air supply from outside the camera retractor assembly fail.

2. The camera assembly of claim 1 in which the control panel is attached to the retractor carriage of the camera retractor assembly.

3. A camera retractor assembly for a furnace, comprising:
a faceplate configured to be attached to the furnace;
a retractor carriage configured to be attached to the faceplate;
a pneumatically operated retractor slidably supported by the retractor carriage;
a camera enclosure attached to the retractor; a lens tube attached the camera enclosure;
a control panel attached to the retractor carriage; and
an air reservoir configured to provide compressed air to retract the pneumatically operated retractor if an air supply from outside the camera retractor assembly fail.

4. The camera retractor assembly of claim 3 further comprising an air manifold for providing compressed air to multiple components of the camera retraction assembly and/or the camera assembly.

5. The camera retractor assembly of claim 4 in which manifold is attached to the retractor carriage.

6. The camera retractor assembly of claim 4 in which the manifold is attached to the retractor carriage.

7. The camera retractor assembly of claim 3 in which the faceplate is attached to a chamber that is attached to the furnace wall.

8. A camera retractor assembly for retracting a camera from a furnace, comprising:
a faceplate configured to be attached to the furnace, the faceplate including an adjuster for aiming the camera, the camera aim remaining substantially unchanged when the camera is removed and replaced;
a retractor carriage configured to be attached to the faceplate;
a pneumatically operated retractor slidably supported by the retractor carriage;
a camera enclosure attached to the retractor;
a lens tube attached the camera enclosure; and
a control panel attached to the retractor carriage.

9. The camera retractor assembly of claim 8 further comprising a camera bracket for mounting the camera enclosure onto the retractor, the camera bracket being adjustable for aiming the camera, thereby providing two adjustment mechanisms, at least one of the adjustment mechanisms being adjustable for aiming the camera without removing the camera from the retractor assembly.

10. A camera retractor assembly for retracting a camera from a furnace, comprising:
a faceplate configured to be attached to the furnace;
a retractor carriage configured to be attached to the faceplate;
a pneumatically operated retractor slidably supported by the retractor carriage;
a camera enclosure attached to the retractor;
a lens tube attached the camera enclosure;
a control panel attached to the retractor carriage; and
a camera bracket for mounting the camera enclosure onto the retractor, the camera bracket being adjustable for aiming the camera without removing the camera from the retractor assembly.

11. A camera retractor assembly for retracting a camera from a furnace, comprising:
a faceplate configured to be attached to the furnace;
a retractor carriage configured to be attached to the faceplate a pneumatically operated retractor slidably supported by the retractor carriage;
a camera enclosure attached to the retractor;
a lens tube attached the camera enclosure; and
a control panel attached to the retractor carriage, in which the camera retractor assembly is configured such that the camera can be removed from the camera retractor assembly and reinserted without significantly changing the adjustment of the camera aim.

12. A camera retractor assembly for a furnace, comprising:
faceplate configured to be attached to the furnace, the faceplate including a left bracket, a right bracket, and an angle adjuster, the angle adjuster allowing adjustment of a camera angle,
retractor carriage configured to be attached to the faceplate a pneumatically operated retractor slidably supported by the retractor carriage;
a camera enclosure attached to the retractor;
a lens tube attached the camera enclosure; and
a control panel attached to the retractor carriage.

* * * * *